(12) United States Patent
Suit et al.

(10) Patent No.: US 9,870,247 B2
(45) Date of Patent: Jan. 16, 2018

(54) SYSTEM AND METHOD FOR DYNAMIC PROVISIONING OF APPLICATIONS

(71) Applicant: Cyber Reliant Corporation, Annapolis, MD (US)

(72) Inventors: John Michael Suit, Mount Airy, MD (US); Ricardo A. Bueno, Arlington, VA (US)

(73) Assignee: CYBER RELIANT CORPORATION, Annapolis, MD (US)

( * ) Notice: Subject to any disclaimer, the term of this patent is extended or adjusted under 35 U.S.C. 154(b) by 59 days.

(21) Appl. No.: 14/739,214

(22) Filed: Jun. 15, 2015

(65) Prior Publication Data

US 2015/0365351 A1    Dec. 17, 2015

Related U.S. Application Data

(60) Provisional application No. 62/012,490, filed on Jun. 16, 2014.

(51) Int. Cl.
| | |
|---|---|
| G06F 15/173 | (2006.01) |
| G06F 9/455 | (2006.01) |
| H04L 29/08 | (2006.01) |
| G06F 9/445 | (2006.01) |

(52) U.S. Cl.
CPC ........... *G06F 9/45558* (2013.01); *G06F 8/60* (2013.01); *H04L 67/34* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 8,966,004 | B2* | 2/2015 | Connelly | G06F 9/45558 705/3 |
| 9,342,357 | B2* | 5/2016 | Grueneberg | G06F 9/4881 |
| 2004/0203690 | A1* | 10/2004 | Sprigg | G06F 9/44526 455/419 |
| 2012/0096142 | A1* | 4/2012 | Suit | H04L 67/22 709/224 |

(Continued)

*Primary Examiner* — Joshua Joo
(74) *Attorney, Agent, or Firm* — Whiteford, Taylor & Preston, LLP; Gregory M. Stone

(57) ABSTRACT

Disclosed is a system and method for the automatic, dynamic provisioning of applications configured to provide users with applications and network communications specifically designed to support their particular task. The provisioning of such capabilities is based on the type of event the user is responding to, such that every time a particular event occurs, a specific set of applications and other toolsets will be provisioned to that user (e.g., onto their individual mobile communication devices, such as tablets, smartphones, or the like) on an ad-hoc basis tailored to that particular event. An inference engine and policy system are provided to intelligently and automatically predict and securely deploy resources to end users. Such inference engine and policy system automate some facets of the assessment process accounting for the manager's, supervisor's, commander's, etc. intent and proposed courses of action—greatly reducing the amount of time required to make good decisions about which applications and services should be employed for any particular operation.

12 Claims, 8 Drawing Sheets

(56) References Cited

U.S. PATENT DOCUMENTS

| | | | |
|---|---|---|---|
| 2012/0159441 A1* | 6/2012 | Ghaisas | G06F 8/10 |
| | | | 717/123 |
| 2013/0268396 A1* | 10/2013 | Agevik | G06Q 30/0631 |
| | | | 705/26.7 |
| 2014/0250433 A1* | 9/2014 | Stekkelpak | G06F 9/44505 |
| | | | 717/176 |
| 2014/0358998 A1* | 12/2014 | Park | H04L 67/34 |
| | | | 709/203 |
| 2016/0092768 A1* | 3/2016 | Patil | G06F 8/61 |
| | | | 706/46 |
| 2016/0308982 A1* | 10/2016 | Greene | G06Q 10/063112 |
| 2016/0321052 A1* | 11/2016 | Sharifi | G06F 8/61 |
| 2017/0102928 A1* | 4/2017 | Cooper | G06F 9/541 |

\* cited by examiner

SYSTEM AND METHOD FOR DYNAMIC PROVISIONING OF APPLICATIONS

CROSS REFERENCE TO RELATED APPLICATION

This application is based upon co-pending U.S. Provisional Patent Application Ser. No. 62/012,490 entitled "System and Method for Dynamic Provisioning of Applications," filed with the U.S. Patent and Trademark Office on Jun. 16, 2014 by the inventor herein, the specification of which is incorporated herein by reference.

FIELD OF THE INVENTION

The present invention relates to systems and methods for distributing applications to multiple users, and more particularly to a system and method for the automated, dynamic provisioning of mission applications based on user type and an environment profile.

BACKGROUND

The complexity of today's various business, commercial, governmental, and other operations and the highly variable technological sophistication of competitors and adversaries make it increasingly difficult for managers, supervisors, operational commanders, and such parties' staffs to make well-informed decisions about what kinds of applications, such as software applications deployed on mobile devices, would best be provided to end users in the widely varied operational situations that they face. The resulting "take everything you have" approach to fielding tends to create dynamics where operators or end users employ the best capabilities that they have against every situation or target that they encounter, regardless of that situation's or target's strategic importance. The reasons for this are manifold, but the challenges are driven primarily by the inability of any human decision-maker to rapidly assimilate and make application provisioning decisions based upon all of the available information.

SUMMARY OF THE INVENTION

Disclosed herein is a system and method for the automatic, dynamic provisioning of applications. Such application provisioning service is an event-based tool that provides users with applications and network communications specifically designed to support their particular task, whether that task is carrying out the duties of a medical doctor in a hospital environment, handling financial transactions across a computer networking environment, undertaking potentially hazardous missions in a military environment, or the like. The provisioning of such capabilities is based on the type of event the user is responding to, such that every time a particular event occurs, a specific set of applications and other toolsets will be provisioned to that user (e.g., onto their individual mobile communication devices, such as tablets, smartphones, or the like) on an ad-hoc basis tailored to that particular event. Some of the key features associated with this capability include a tailored set of applications specifically designed to support the user's task, tailored network configurations and communications designed to enable secure communications between various authorized participants, and an enhanced set of sophisticated security features that are designed to be invisible to the user, but that ensure safe and secure team operations and communications. The system and method disclosed herein utilize an inference engine and policy system to intelligently and automatically predict and securely deploy resources to end users. Such inference engine and policy system automate some facets of the assessment process accounting for the manager's, supervisor's, commander's, etc. intent and proposed courses of action—greatly reducing the amount of time required to make good decisions about which applications and services should be employed for any particular operation.

As will be detailed further below, the system and method described herein provide for the automated provisioning of task-specific applications based on user type and an environment profile, and provide for the automated tailoring of the computing platform, the operating system, and network and communications configurations. Likewise, the system and method described herein provide for automated resource allocation to and de-allocation from end users based on specific event requirements. The system and method utilize integrated access control to ensure that only authorized users have access to a specific virtual machine ("VM") or VM type and/or an event community of interest. The system and method also provide users with updates and resources based on changing event conditions, and ensure secure, reliable, and safe security features designed to scale from small groups to large enterprises.

The automated provisioning of mission applications as described above provides significant value to the overall organization that wishes to deploy applications to a community of end users. Particularly, the system and method provide time savings and quick reaction; they accelerate response and fielding time by automating mission application provisioning time, and by storing past operational VM containers for reuse. Moreover, cost savings are realized, as the foundation platform hosts multiple mobile application provisioning service containers for several mission events via VM's. This reduces energy consumption by eliminating specialized systems and replacing them with VM's for both mission servers and PC's. This also releases the foundation platform by moving event-based applications to containers that can be deployed again and again. Further, this shifts investments from maintaining systems to developing new capabilities. Still further, this leverages industry standards to lower cost of ownership and supportability and maturity expenses.

Additional value is realized by mission flexibility and extensibility, as the mission-specific applications and other resources are able to be customized and personalized for the particular user for a specific event, mission, or task at a particular time and/or for particular operating environment conditions, thus increasing their individual performance. The highly customized and configured VM containers are based on pre-configured or ad-hoc templates, can be configured for one or more types of relationships (e.g., one VM configuration for a supervisor, a different VM configuration for someone working under that supervisor, etc.), and can likewise be tailored to represent a response tactics, techniques, and procedures ("TT&P") profile depending upon event type, domain type, target type, etc. Further, customization to the end user may be provided and extended to support an operator's style of response and preferred tools.

Moreover, still additional value is realized by providing a high level of security without sacrificing operational capability. The system and method described herein help protect against insider threat by "binding" software to the targeted device and the user assigned to that particular device. In the event of a virus attack, the VM containers can be isolated to limit the virus to the infected VM, thus preventing a systemic outbreak.

Still further, value is realized by allowing information sharing and enabling cross-domain communications and resource sharing. Sensitive corporate data is protected by provisioning VM's to run in a specific virtual community based on corporate policies. For example, a particular product development team working on a single project can become a common community of interest, with VM's distributed to each that, while customized for each user, allow sharing of data and computing resources and specialized communication configurations for and among that particular community. Thus, high assurance communities of interest can be established based on project or mission sharing requirements.

Even further, value is realized through the project- or mission-centric character of the system and method of the invention, which provides for dynamic needs in the organization and offers an anywhere, anytime capable function. The automated application provisioning function is portable, scalable, and mobile, and supports tethered or disconnected operations from corporate facilities to a mobile deployment scenario.

BRIEF DESCRIPTION OF THE DRAWINGS

The numerous advantages of the present invention may be better understood by those skilled in the art by reference to the accompanying drawings in which.

DETAILED DESCRIPTION OF THE PREFERRED EMBODIMENTS

The following description is of a particular embodiment of the invention, set out to enable one to practice an implementation of the invention, and is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Figure 1:
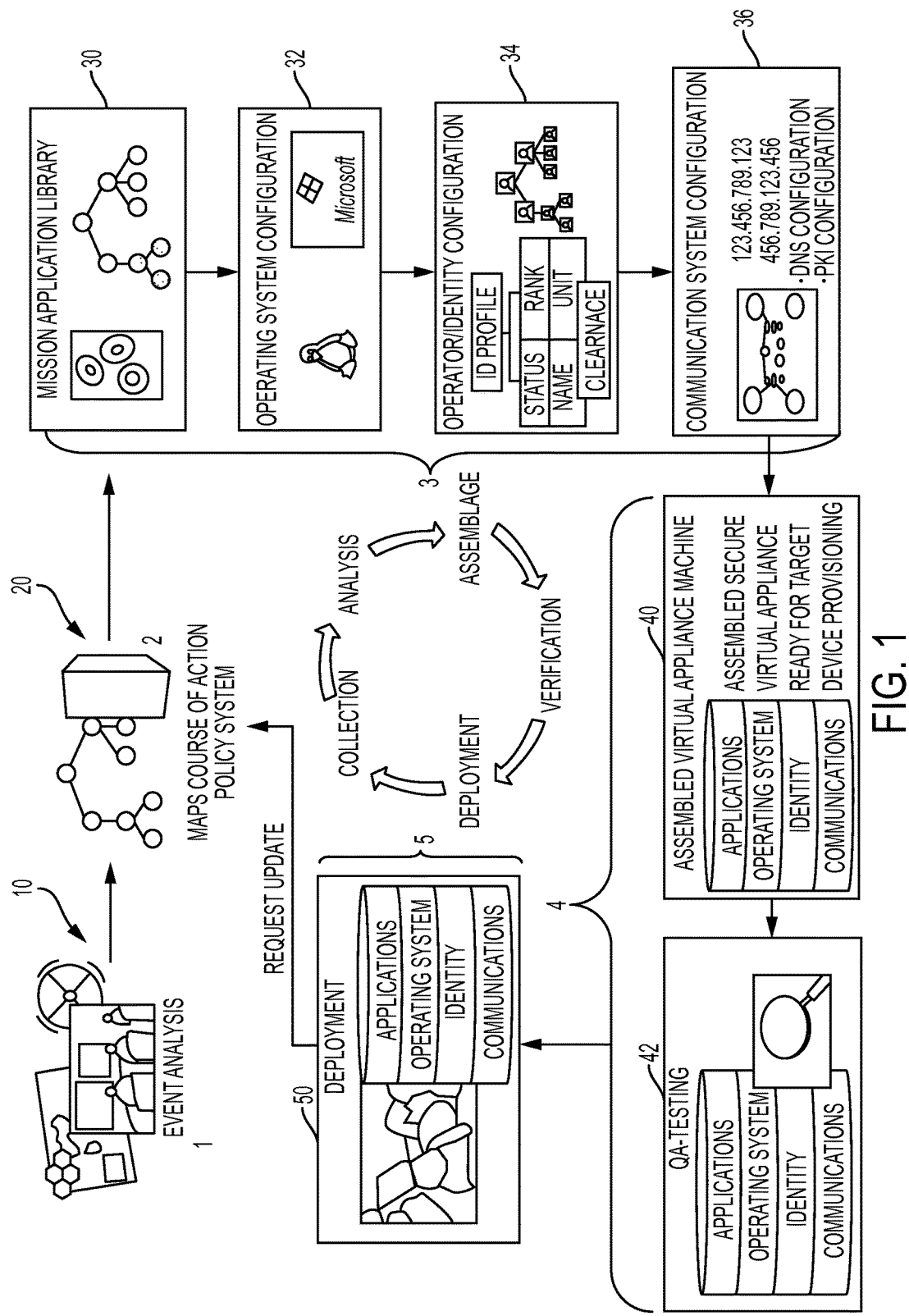
FIG. 1 shows a schematic view of a process for dynamic provisioning of applications in accordance with certain aspects of an embodiment of the invention.

FIG. 1 shows a schematic view of a process for dynamic provisioning of applications in accordance with certain aspects of an embodiment of the invention. As shown in FIG. 1, an event is being experienced by an intended end user of applications that are to be dynamically provisioned, which event may be monitored by a monitoring station at step 10. For instance, such an event might be a patrol team coming upon a threat environment, in which case they may have sudden need to be provisioned with specialized communications applications, mapping applications, data feeds indicating location of potential targets, background intelligence information, and the like, all of which should be available to them in a simple user interface that allows them instant access to such applications and information. As the event is analyzed and identified, at step 20 a mission application provisioning service ("MAPS") determines, using an inference engine and knowledge base as detailed further below, what applications, VM containers, data, and the like should be delivered to those end user's mobile devices. The system then pulls appropriate mission applications from an applications library at step 30, configures the operating system that will run in a VM environment on the user's mobile device at step 32, configures the interface for each such end user based upon the end user's specific identity profile at step 34, and configures the communication system to communicate with such end users' mobile devices at step 36. The system then assembles those features into a secure VM at step 40, and preferably after conducting testing to ensure proper function at step 42, deploys the VM's to the end user's individual mobile devices at step 50. Thereafter, as the mission or task is carried out and as conditions faced by the end user change, updates may be requested of the MAPS to modify the end user's configuration on their mobile device so as to meet their current needs. Once the mission is completed, the suite of applications, data, and the like that were delivered to the end user's mobile devices may be decommissioned from those devices, and after-action data may be collected and analyzed and used to further enrich the inference engine and knowledge base to ensure that future deployments of applications and data are best suited to the end user's actual environment.

Thus, the workflow of the system and method of an embodiment of the invention proceeds as follows. The system workflow assumes that an analyst will profile the mission or task, and that a Community of Interest ("COA") interface will provide the policy system with the attributes required to select and configure tools based on the mission requirements. A COA is a group of like entities that comprise like or similar subjects or objects within a communication system, meaning that they share a relationship whereby knowledge and objects may be lent or shared from one another. A team of people serving a common interest is an example, such as a group of aid workers in a remote area offering medical attention to an indigenous population. A group of computers that share information with each other either programmatically scheduled or as needed based on events is also a community of interest.

Then, based on the mission requirements, the bundled tool set of applications, data, and the like can be provisioned on a console, a laptop, a mobile device, or the like. The policy system provides for the configuration and tailoring of the operating system, application/tool bundling, and IP/DNS connection support to other management or command locations. The provisioned VM or virtual appliance ("VA") can be configured to support a specific system, operator, group, or event using an identity management or access control system such as Active Directory, LDAP, and/or Attribute Based Access Control capabilities, or the VM can be deployed directly with standard access control features leveraged. Once the VM or VA has been bundled, it will preferably go through a verification and validation test to ensure that all components are operating as intended and that all security mechanisms have been applied based on mission requirements. After such verification, the bundled tool set will be provisioned (i.e., downloaded) to the end user's end-point device, such as a mobile device. During the particular task or operation, if the bundled tool set becomes corrupted or compromised, the security and integrity capabilities will determine what the corruption or compromise is and will affect a repair without requiring the end user to stop their task or operation. The end user can also request an update of the toolset based on changing operational requirements, and such update will be applied based on the network capability to include an austere environment. Further, when the task or operation is complete, the end user can off-load data relating to the task or operation, and in certain situations (and where appropriate) may turn in the mobile computing device for re-purposing. This will reduce the number of redundant computing devices required, thus providing potentially significant cost savings.

The system and method disclosed herein utilize an inference engine and policy system to intelligently and automatically predict and securely deploy resources to end users. In making use of the inference engine, the system and method employ an inference engine architecture as shown schematically in FIG. 2. The inference engine employs base algorithms 200 that include the logic used to implement the inferences, and a workflow used to manage the overall inference process. The inference engine architecture also employs an ontology framework 210 having established domain ontologies, and providing a pluggable ontology interface to allow for multiple ontologies. The inference engine architecture also employs semantics 220 for each ontology (N semantics per associated 1 ontology), and policies 230 for each semantic (M policies per associated N semantics within the domain ontology).

Figure 3:
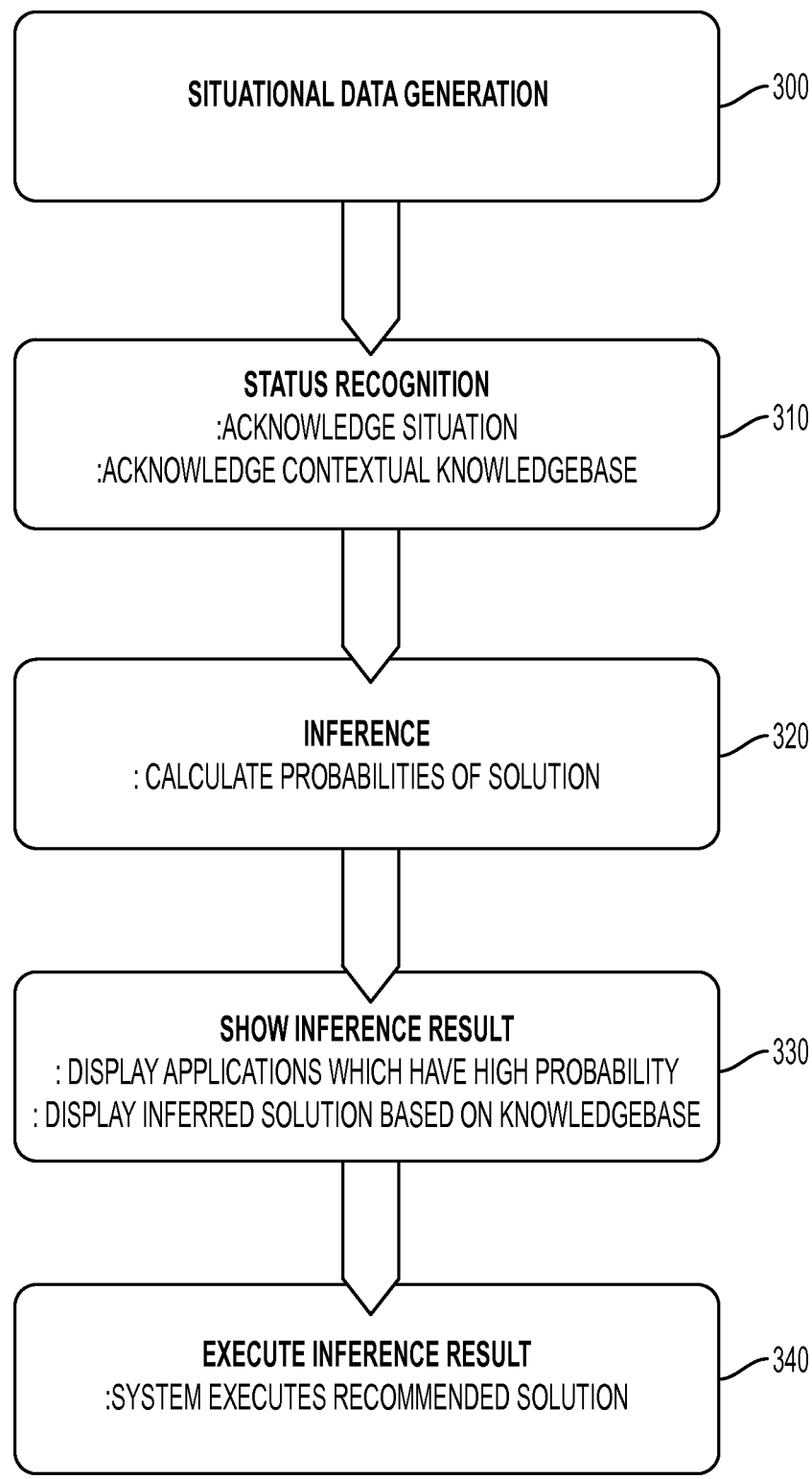
FIG. 3 shows a workflow of the inference engine of FIG. 2.

The inference engine workflow is shown in FIG. 3. Overall, the inference engine is used to make determinations of what applications are to be distributed to end users based on the current situational circumstances experienced by the end users. As shown in FIG. 3, at step 300, the system generates situational data that will be used by the inference engine to determine the applications and computing services to be distributed to end users. At step 310, the system conducts a status recognition acknowledging the situation and a contextual knowledgebase, as discussed in greater detail below. At step 320, the system generates inferences via the inference engine, in which probabilities of particular solutions are calculated. At step 330, the inference result is displayed, particularly including an indication of applications that have a high probability of applicability to the end user's situation, and an inferred solution based on the knowledgebase. Last, at step 340, the inference result is executed by distributing the recommended solution to the designated end users.

Figure 4:
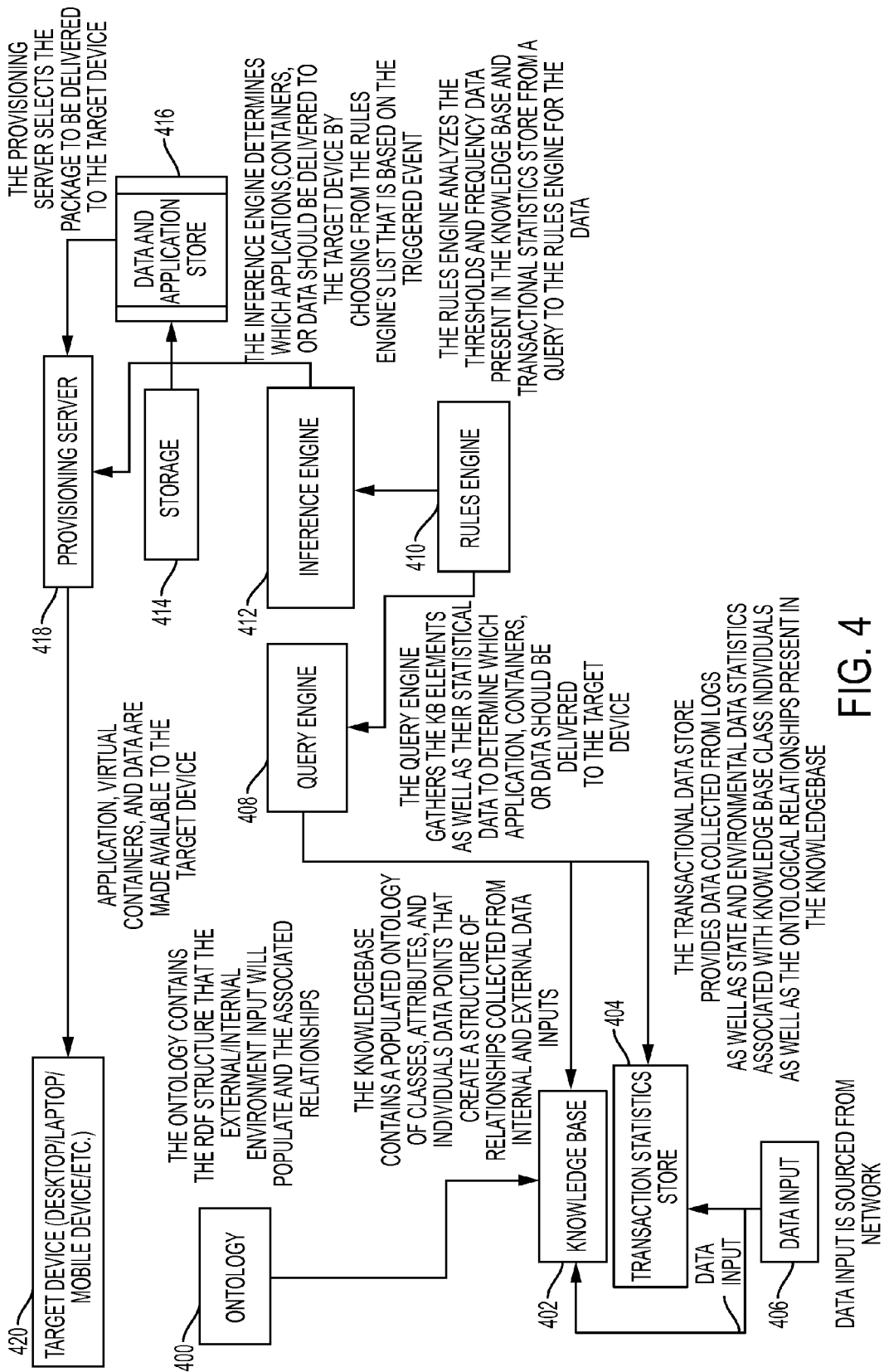
FIG. 4 is a high level schematic view of the elements of a system suitable for implement a method in accordance with certain aspects of an embodiment of the invention.

FIG. 4 provides a high level schematic view of the elements of a system suitable for implementing the foregoing method in accordance with certain aspects of an embodiment of the invention. As shown in FIG. 4, an ontology 400 contains a resource description framework structure that is populated with the external/internal environment input, and the associated relationships among that data. A knowledge base 402 contains a populated ontology of classes, attributes, and data points associated with class individuals in a community of interest that create a structure of relationships collected from internal and external data inputs. Likewise, a transaction statistics store 404 is a data store providing data collected from logs, as well as state and environmental data statistics associated with class individuals of the knowledge base 402, as well as the ontological relationships present in the knowledgebase 404. Both knowledge base 402 and transaction statistics data store 404 receive data input 406 from the network on which such system is operating. A query engine 408 gathers elements from the knowledge base 402, as well as their statistical data, to determine which applications, VM containers, data, or other services should be delivered to the target mobile devices 420 of the end users. A rules engine 410 analyzes the thresholds and frequency data present in the knowledge base 402 and the transactional statistics data store 404 from a query issued to the rules engine for the data, as discussed in greater detail below. As referenced above, inference engine 412 determines which applications, VM containers, data, or other computing services should be delivered to the end user target devices 420 by choosing from the rules engine's list that is based on a particular triggered event. Such delivery is provided by a provisioning server 418, which selects the package of services that are to be delivered to the target devices 420 from a data and application store 416, which in turn may obtain the selected services from a storage device 414.

As noted above, in addition to determining what applications are to be distributed, the inference engine also determines computing resources to be assigned to different system end users. More particularly, in order to dynamically provision end users with needed applications on an ad hoc basis, a dynamic application provisioning system framework is utilized to process a dynamic application provisioning systems dataset. An application such as a mobile application manager framework is utilized to manage the data in parallel on a given computing platform. An example of such a framework is Hadoop. Hadoop is directed via a drive mount to the computing device containing the hadoop cluster applications.

A dynamic application provisioning system analytics application is utilized by the system to determine a method for processing the dynamic application provisioning system dataset. Likewise, an ontological data store is utilized to store meta data associated with the dynamic application provisioning system analytics in conjunction with candidate mobile devices. Further, a mobile hypervisor may be utilized to run applications for distributed processing.

To determine which mobile devices are suitable for distributed processing, the inference engine will utilize several factors as input to an OWL-based (web ontology language) ontology. These factors include process ability and method of virtual machine distribution. Heuristic factors include idle time, connection time, connection availability, and charging status. These factors are prioritized and assigned a value in order to pair the appropriate distributed processing task with the appropriate mobile device.

Processing ability: Includes Hypervisor (Yes or No)
    Processing capacity: 1 ghz or Higher (Yes or No)
    Heuristic factors:
    Time Idle (>10 minutes)+5
    Avg. Connection Time (<15 minutes)+2
    Connection Availability (No Mobile Network, Wifi available)+20
    Charging Status (Charging)+10

The above factors are provided to the rules engine to determine the ideal mobile candidates for distributed processing. If enough candidates are present that achieve a predesignated maximum index score (e.g., a maximum index score of 37 using the values assigned above), then no other determination is required for the distributed processing cycle. Each cycle has a default of preferably 30 minutes. In an alternate method, the user using an application such as a mobile application manager may modify this cycle.

The instantiation sequence proceeds as follows:

Virtual machines are uploaded to mobile hypervisors. The virtual machines register with a pre-determined network location encoded in the VM operating system.

The virtual machine distributed mobile processing application is registered with the host dynamic application provisioning system server.

The dynamic application provisioning system server then forwards registered mobile phone candidates by ESN number to the OWL-based ontology knowledge base.

The dynamic application provisioning system server initiates network communication with the mobile virtual machines and instructs the distributed mobile processing application resident on the mobile devices to begin recording heuristic data.

Once 24 hours of data is collected by the mobile device, it re-establishes communications with the dynamic application provisioning system server.

The mobile device then sends the qualifying factors and heuristic data back to the dynamic application provisioning system server.

The dynamic application provisioning system server forwards the received data to the OWL-based ontological knowledge base.

The dynamic application provisioning system server sends a message to the rules engine where the data is analyzed. Such analysis includes a parsing for objects that are populated in a list by an operations manager or an individual operator/system end user themselves. This input is inserted via a message (JSON) by an admin console, either directly input via the UI or the API that may be accessed by the operator remotely by sending a message from their device, e.g., via their radio back to the depot from which the system is monitored. This results in a message formatted that the console's API can read. The message instructs the rules engine with a list of objects with which to query the query engine to iterate over the knowledge base and statistical engine for the objects sent in the message by the operator. This will determine if there is a "hit" that will return useful information that may be valuable from a direct or indirect relationship and or a temporal perspective.

The rules engine queries the ontology for qualifying mobile devices with a score of, e.g., 37. These candidates are annotated with "maximum score" in the knowledge base.

All registering mobile devices are continually updating every 24 hours. The maximum score mobile devices are updated continually, so that a cadre of maximum score devices are available when the mobile application manager application is ready to assign tasking to the devices.

In a typical dynamic application provisioning system distributed processing environment, a mapper is utilized to break up the processing tasks to be distributed.

Once the tasks are ready for distribution, the rules engine is queried for distribution targets (i.e., mobile candidates). A query is performed by the yield of the rules engine. The rules engine provides a list of registered devices (targets) that are eligible to receive virtual machines, applications, data, and messages. This list is initially created when configuring the overall system, and devices can be added anytime as needed. The configuration process includes attributes, which are populated in the knowledgebase and the system console. Knowledge base attributes include device type, capacity, O/S, operational tolerances, etc.

If the mobile application manager requests are fulfilled by the maximum score mobile devices, then the process ends until the mobile application manager application needs a new cadre of distribution processing devices.

If further distribution processing devices are required, the rules engine utilizes the knowledge base ontology to determine the best mix of candidates. Because all the factors are not of equal weight, the rules engine must balance the remaining mix of devices to provide maximum benefit to the mobile application manager application and overall processing effort.

Figure 2:
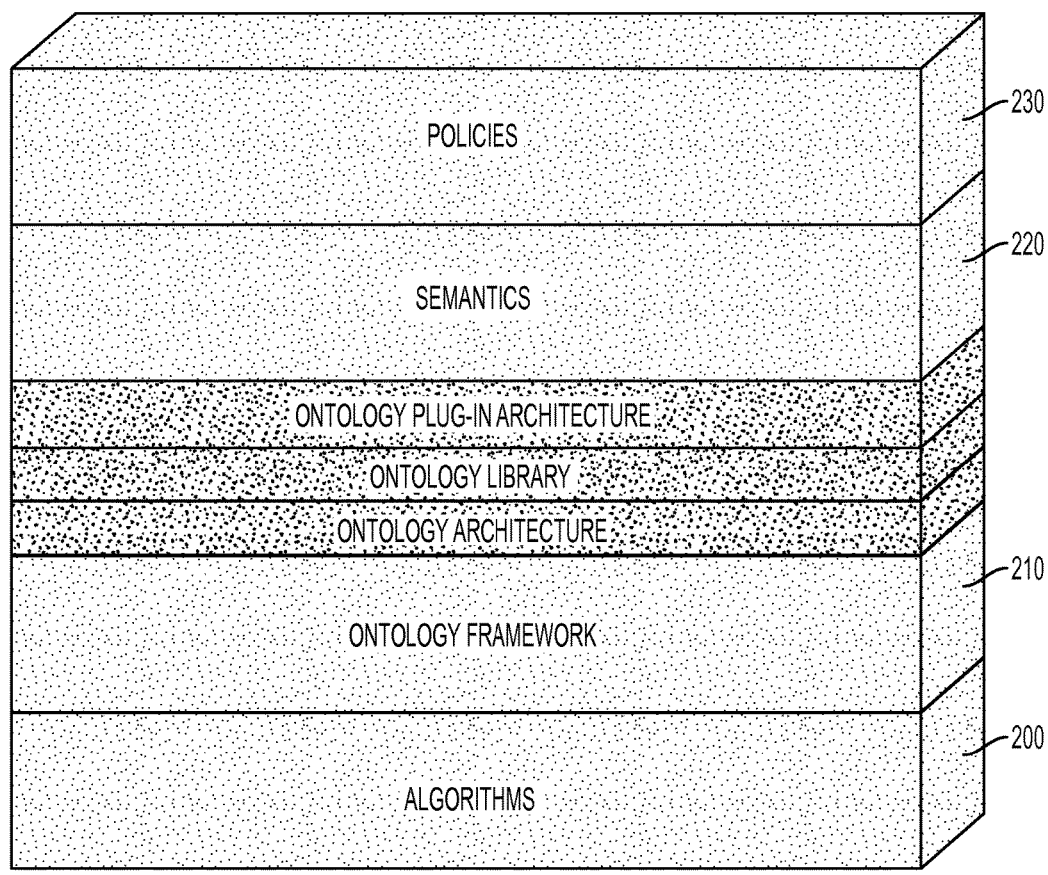
FIG. 2 is a schematic view of an inference engine architecture for use with a system and method according to certain aspects of an embodiment of the invention.

With reference to the functions performed by the system shown in FIGS. 1 and 2, virtual machine connectivity is handled by the use of NetStat. Netstat (network statistics) is a command-line tool that displays network connections (both incoming and outgoing), routing tables, and a number of network interface statistics. It is available on Unix, Unix-like, and Windows NT-based operating systems. Activity is handled by both the hypervisor API such as VIX API and by a Direct VM API such as WMI.

The VIX API (or "Vix") is a library for writing scripts and programs to manipulate virtual machines. It is high-level, easy to use, and practical for both script developers and application programmers. VIX API runs on Microsoft Windows (Windows XP, Windows Server 2003, or later) and Linux platforms.

Windows Management Instrumentation (WMI) is the primary management technology for Microsoft® Windows® operating systems. It enables consistent and uniform management, control, and monitoring of systems throughout an enterprise. Based on industry standards, WMI allows system administrators to query, change, and monitor configuration settings on desktop and server systems, applications, networks, and other enterprise components. System administrators can write scripts that use the WMI Scripting Library to work with WMI and create a wide range of systems management and monitoring scripts. WMI is installed natively in the Windows operating System.

The virtual machines implemented in accordance with an embodiment of the invention maintain all the same connections and behaviors as a physical machine. In most cases, a virtual machine is not aware, but rather it is a virtual machine. A virtual machine (VM) is a completely isolated guest operating system installation within a normal host operating system. Modern virtual machines are implemented with either software emulation or hardware virtualization or (in most cases) both together.

In computing, a hypervisor, also called virtual machine manager (VMM), is one of many hardware virtualization techniques allowing multiple operating systems, termed guests, to run concurrently on a host computer. It is so named because it is conceptually one level higher than a supervisory program. The hypervisor presents to the guest operating systems a virtual operating platform, and manages the execution of the guest operating systems. Multiple instances of a variety of operating systems may share the virtualized hardware resources. Hypervisors are very commonly installed on server hardware, with the function of running guest operating systems that themselves act as servers.

The system described herein is configured to determine dependencies of the VMs with errors providing feedback regarding a VM usage dependency. Errors are important in this regard to determine if the dependencies are operating as they should with the storage to which they have been allocated. In enterprises where virtualization exists, it is so easy to allocate or "link" storage to a virtual machine that there are often unintended consequences. Taking into account what errors are present lets the inference engine know what is working and what is not. The invention can help establish a healthy allocation of specific storage to specific VM dependencies.

A critical error is where the hypervisor reports an error associated with the operation or allocation of resources to the virtual machine. Errors in the operational relationship with the VM may be managed using a list that is maintained in the OWL-based knowledge base. This list is an expression of triples (ontology) for each record which consists of a virtual machine's relationship to storage. Any resulting errors or failures result in the system messaging an orchestration engine by utilizing the orchestration engine WSDL to move to the next record contained within the OWL based knowledge base. The process is iterated through until all connections have been tried. Particularly, from within the VM, a connection is established to the VM. This happens with frequency in all OS types used with virtual machines. This is monitored with NetStat. When the VM "tries" the connection, the system will correlate with errors that are observed by connecting to the APIs.

If more than one record results in no errors or failures, the duration is doubled (because errors need to be discovered so the monitoring duration must be extended). If the result is the same (i.e., no error), then each record is used for a period, e.g. for 72 hours, to account for intermittent errors or errors that have been resolved by the virtualization environment management system. If the result is the same, then the user is offered the remaining records as options, in order to provide the user with evidence for inferences as used by the system set forth herein. Additionally, this can be used by the user as a correlated result that may not be evident to any of the reporting systems. The foregoing is accomplished by a query engine accessing the knowledge base.

For example, "VMWin2k8" has storage device "LUN8890EMC2", and "LUN8890EMC2" provides storage for "VMWin2k8".

An error example may be formatted as follows:
Timestamp World adapter id lun Command Error Message
 0:00:00:39.217 01024 LUN8890EMC2 000 000 [0x2A] WRITE(10) [0x5:0x24:0x0]ILLEGAL REQUEST: Invalid field in CDB[0x0]

Errors that might occur include any error with the operational relationship with the VM. This could be anything from network latency because of where the virtual and physical devices exist, to a VM inability to mount the storage due to a configuration problem that only exists when the VM is migrated to a different network statement.

The components needed to implement a method as described above are present in a typical enterprise virtualization implementation. The typical enterprise includes several components needed to emulate a physical enterprise-computing environment. These components must be architected to efficiently exchange data and process information for business applications. The components required are a least one physical host, a network device such as a virtual router capable of virtual networking, as well as physical routers capable of providing network access to the physical network infrastructure. At a minimum, one storage device should be provided that is capable of providing access to the virtual infrastructure.

Figure 5:
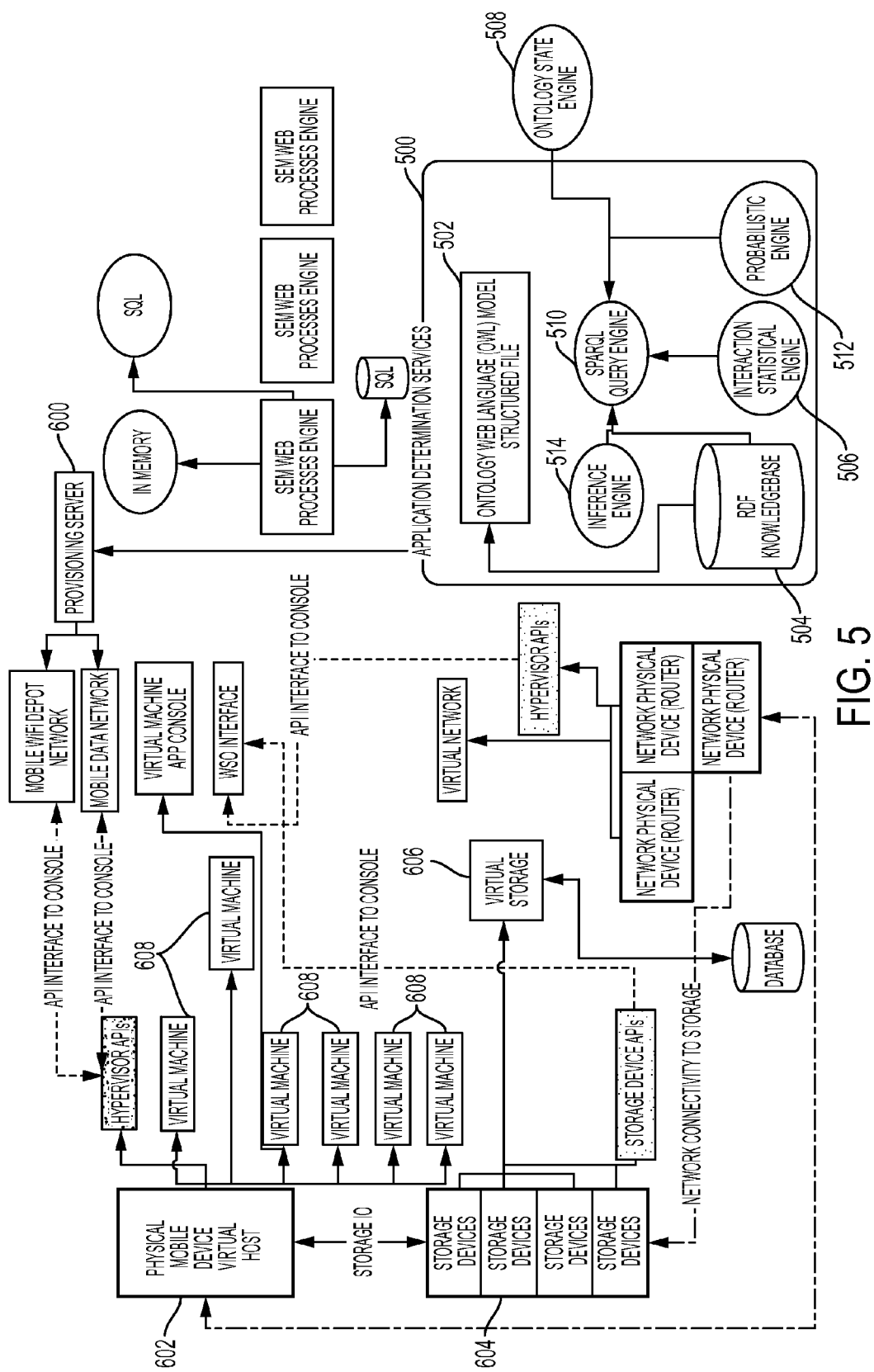
FIG. 5 is a schematic view of a system for the dynamic provisioning of content in accordance with certain aspects of an embodiment of the invention.

The generalized logical functions described above with regard to FIG. 4 may be implemented as shown in FIG. 5, which shows a system for the dynamic provisioning of content. A system configured generally as shown in FIG. 5 allows an operator of the system to store knowledge that may be used to provision content ephemerally (as needed) and to remove that content when it is no longer needed. Such a system allows for the storing of knowledge in a knowledge base 504, which knowledge is used by an inference engine 514 to make a decision on what content (e.g., applications) that are contained in the provisioning server 600 are to be provisioned to an end point in the form of a virtual machine 608. More particularly (and with continued reference to FIG. 5), an application determination services module 500 is executed by a processor in data communication with a provisioning server 600 (configured as described above with respect to FIG. 4). Application determination services module 500 may comprise various modules configured to carry out the functions described above with regard to FIG. 4. More particularly, application determination services module 500 includes an ontology web language (OWL) model structured file 502 implementing ontology 400, RDF knowledgebase 504 implementing knowledge base 402, interaction statistical engine 506 implementing transaction statistics data store 404, ontology state engine 508 from data input 406, SPARQL query engine 510 implementing query engine 408, probabilistic engine 512 implementing rules engine 410, and inference engine 514 implementing inference engine 412, all as described above.

Storage IO is accomplished over a TCP/IP network in virtual environments. This is the fiber, Ethernet, SCSII, NAS, or even SATA connection from the physical host 602 to the physical storage device 604. This is used by the system to send and receive file content and metadata.

Likewise, virtual storage conduit is accomplished by a hypervisor abstracting virtual storage 606 based on its actual physical storage connection. This is not a physical connection, but rather is a socket connection within the hypervisor layer of the physical virtual machine. It is used by virtual devices 608 to send and receive data as they would in a physical enterprise.

Optionally, the method and system described above may likewise be used to allow provisioning server 600 to also communicate with a cloud interface API (not shown) in order to provision the virtual machine in the form of a cloud instance, with the destination of the provisioned virtual machine 608 remaining as shown in FIG. 5.

Provisioning server 600 is capable of producing virtual machines in several formats (VMDK, OVA, OVF, AMI, etc.), in addition to AMI (Amazon Machine Image) in instances of provisioning the virtual machine in a cloud instance.

As explained above, the essential application components include a datastore, a dataset, a typical distributed processing framework such as Hadoop, an OWL-based knowledge base, a rules engine, an inference engine, an enterprise network, a mobile data network, and mobile devices.

A hypervisor, also called a virtual machine manager (VMM), allows multiple operating systems to run concurrently on a host computer. The hypervisor presents a virtual operating platform to guest operating systems and manages the execution of the guest operating systems. Multiple instances of a variety of operating systems may share the virtualized hardware resources. Hypervisors may be installed on the hardware of the server, with the function of running the guest operating systems that themselves act as servers.

In order to provide for the successful, dynamic application-provisioning across mobile devices, in accordance with certain aspects of an embodiment of the invention, a large dataset is preferably transmitted to a datastore such as a virtual storage, network attached storage, cloud storage, or network storage.

Virtual Storage may be provided by a hypervisor abstracting virtual storage based on its actual physical storage connection. This is not a physical connection, but rather is a socket connection within the hypervisor layer of the physical virtual machine. Such virtual storage may be used by virtual devices to send and receive data as they would in a physical enterprise.

Cloud storage may be provided, which comprises a service model in which data is maintained, managed and backed up remotely and made available to users over a network (typically the Internet). There are three main cloud storage models, as follows. First, public cloud storage services, such as Amazon's Simple Storage Service (S3), provide a multi-tenant storage environment that is most suitable for unstructured data. Next, private cloud storage services provide a dedicated environment protected behind an organization's firewall. Private clouds are appropriate for users who need customization and more control over their data. Last, hybrid cloud storage is a combination of the other two models that includes at least one private cloud and one public cloud infrastructure. An organization might, for example, store actively used and structured data in a private cloud and unstructured and archival data in a public cloud.

Network-attached storage (NAS) may be provided, which comprises hard disk storage that is set up with its own network address rather than being attached to the server computer that is serving applications to a network's workstation users. By removing storage access and its management from the server, both application programming and files can be served faster because they are not competing for the same processor resources. The network-attached storage device is attached to a local area network (typically, an Ethernet network) and assigned an IP address. File requests are mapped by the main server to the NAS file server.

Likewise, physical storage devices may be provided. In computer storage, a logical unit number or LUN is a number used to identify a logical unit, which is a device addressed by the SCSI protocol or similar protocols such as Fibre Channel or iSCSI. A LUN may be used with any device which supports read/write operations, such as a tape drive, but is most often used to refer to a logical disk as created on a SAN. Though not technically correct, the term "LUN" is often also used to refer to the drive itself.

The inference engine 514 implements the Jena OWL reasoner for instance-based reasoning. The Jena OWL reasoners could be described as instance-based reasoners. That is, they work by using rules to propagate the if-and-only-if implications of the OWL constructs on instance data. Reasoning about classes is done indirectly—for each declared class, a prototypical instance is created and elaborated. If the prototype for a class A can be deduced as being a member of class B, then we conclude that A is a subClassOf B. This approach is in contrast to more sophisticated description logic reasoners that work with class expressions and can be less efficient when handling instance data but more efficient with complex class expressions and able to provide complete reasoning.

The Web Ontology Language (OWL) is a family of knowledge representation languages for authoring ontologies. The languages are characterized by formal semantics and RDF/XML-based serializations for the Semantic Web. OWL is endorsed by the World Wide Web Consortium (W3C) and has attracted academic, medical and commercial interest.

In October 2007, a new W3C working group was started to extend OWL with several new features as proposed in the OWL 1.1 member submission. W3C announced the new version of OWL on 27 Oct. 2009. This new version, called OWL 2, soon found its way into semantic editors such as Protégé and semantic reasoners such as Pellet, RacerPro, FaCT++ and HermiT.

The OWL family contains many species, serializations, syntaxes and specifications with similar names. OWL and OWL2 are used to refer to the 2004 and 2009 specifications, respectively. Full species names will be used, including specification version (for example, OWL2 EL). When referring more generally, OWL Family will be used.

It is anticipated that the OWL rule reasoner will be most suited to applications involving primarily instance reasoning with relatively simple, regular ontologies and least suited to applications involving large, rich ontologies.

The OWL reasoners should be smooth extensions of the RDFS (Resource Description Framework Structure) reasoner. That is, all RDFS entailments found by the RDFS reasoner will also be found by the OWL reasoners, and scaling on RDFS schemas should be similar (though there are some costs, as explained below). The instance-based implementation technique is in keeping with this "RDFS plus a bit" approach.

Another reason for choosing this inference approach is that it makes it possible to experiment with support for different constructs, including constructs that go beyond OWL, by modification of the rule set. In particular, some applications of interest involve ontology transformation which very often implies the need to support property composition. This is something straightforward to express in rule-based form and harder to express in standard description logics.

Because RDFS is not a subset of the OWL/Lite or OWL/DL languages, the Jena implementation is an incomplete implementation of OWL/full. Thus, three implementations are provided: a default ("full") one; a slightly cut down "mini"; and a rather smaller/faster "micro". The default OWL rule reasoner (ReasonerRegistry.getOWLReasoner( )) supports the constructs described herein. The OWLMini reasoner is nearly the same but omits the forward entailments from minCardinality/someValuesFrom restrictions—that is, it avoids introducing bNodes which avoids some infinite expansions and enables it to meet the Jena API contract more precisely. The OWLMicro reasoner just supports RDFS plus the various property axioms, intersectionOf, unionOf (partial) and hasValue. It omits the cardinality restrictions and equality axioms, which enables it to achieve much higher performance. It is anticipated that other inference engines will be suitable, and potentially optimal, for particular operational requirements. The selection criteria are based on the customer's requirements for rapid, ad-hoc, automated provisioning. Currently, there are several commercially available inference engines that are in use through the defense and intelligence communities, and it is envisaged that one of these technologies may be used in order to align with the operational domain and to minimize risk of non-adoption. Specific inference engine characteristics may be adapted to optimize the above-described methods. They include: base algorithms (the logic used to implement inference and the workflow used to manage inference process); ontology framework (the established domain ontologies and the pluggable ontology interface to allow for multiple ontologies); semantics per ontology (N semantics per associated 1 ontology); and policies per semantics (N policies per associated N semantics (within the domain ontology)). This over-arching architecture is component based and provides the greatest flexibility and broadest range of use for anticipated users/benefactors of the system described herein.

As referenced above, the system in accordance with certain aspects of an embodiment of the invention employs an ontological framework. In computer science and information science, an ontology formally represents knowledge as a set of concepts within a domain, and the relationships among those concepts. It can be used to reason about the entities within that domain and may be used to describe the domain. In theory, an ontology is a "formal, explicit specification of a shared conceptualisation". An ontology renders shared vocabulary and taxonomy which models a domain with the definition of objects and/or concepts and their properties and relations.

Ontologies are the structural frameworks for organizing information and are used in artificial intelligence, the semantic web, systems engineering, software ngineering, biomedical informatics, library science, enterprise bookmarking, and information architecture as a form of knowledge representation about the world or some part of it. The creation of domain ontologies is also fundamental to the definition and use of an enterprise architecture framework.

Further, and again as explained above, the system employs a rules engine. For example, Open Rules may utilize the power of applications such as MS Excel®, Eclipse IDE and open source Java® libraries to create, deploy, execute, and maintain different rules engines with complex business logic controlled by business analysts. OpenRules is a full-scale open source Business Rules Management Framework. It efficiently uses the power of MS Excel, Eclipse IDE and open source Java libraries to create, deploy, execute, and maintain different rule engines with complex business logic controlled by business analysts.

Again as noted above, the applications that are distributed to users/operators in the field may be executed in hypervisor environments, with the processing necessary to implement such environments being distributed among multiple resources. Traditionally, enterprises are comprised of various nodes that contribute to an overall business process. These nodes may be comprised of both physical and virtual machines. Where enterprise networks are comprised of virtual machines, physical hosts are required to provide an allocation of resources. These hosts may reside on enterprise-based devices, cloud infrastructure, and mobile devices such as smart phones. These resources may be utilized to solve the problem of dynamic application provisioning system processing. There is already a need to process massive amounts of data faster; the key is to distribute the processing to available resources. Dynamic application provisioning system processing has been accomplished utilizing distributed virtual environments as well as cloud environments. Utilizing these proven methods, it is possible to access a new computing resource on mobile computing platforms that are otherwise utilized. Mobile phones, and specifically smart phones, often have 1 GHz processors or even faster on board. With the advent of virtualization technology on these platforms, where the hardware is specifically designed to operate as a hypervisor in a secondary or primary capacity, it is possible with this process to determine which platforms are the best candidates at the most opportune times for such computing utilization.

Such hypervisor environments employ VM's, which comprise a completely isolated guest operating system installation within a normal host operating system. Modern virtual machines are implemented with either software emulation or hardware virtualization or (in most cases) both together.

In use in the system and method of the invention, a list is generated for each virtual machine registered to each virtualization platform. The administrator is then presented the aggregate virtual machines to be eligible for multi-platform migration.

Once VMs are selected for eligibility based on the admin's domain knowledge of the specific environment, the administrator is presented with an option to export each of the VMs to an OVF Format.

The admin will configure the environmental variables with a central storage location for the OVFs to be exported.

The VMs are exported as OVF Virtual Machines to the central storage location where they are archived and will be utilized by the VM-Migration Engine.

The process to migrate VMs from one platform to another is as follows by way of example:

An administrator selects a platform they would like to free up resource allocation on.

The system presents the available resources in terms of percentage of available capacity to execute virtual machines.

The admin inputs into the VM-migration engine console the desired increase in aggregate capacity.

Once the desired increase is received, the query engine computes a delta between current capacity and desired capacity. This percentage is transformed by the rules engine to an equivalent measure in terms of VMs to be migrated.

The inference engine will present the administrator a list of machines to be migrated.

Once the administrator confirms the list of VMs to be migrated by the VM-migration engine, the engine will then initiate the API calls to suspend the VMs, and then export the VMs to the central store. The engine then utilizes the destination virtualization platforms APIs to Import the VM from the central store's URL.

The resulting VM is then started in the new platform environment, alleviating the preferred virtualization platform's capacity.

In an alternate method of the invention, the process to migrate VMs from one platform to another is as follows by way of example:

An administrator selects a platform they would like to free up resource allocation on.

The administrator verifies that all VMs on the aggregate virtualization platforms are utilizing remote storage for all data.

The administrator verifies all network routing and security is defined to allow all eligible VMs will have access to their remote storage and dependencies post migration by the VM-migration engine.

The system presents the available resources in terms of percentage of available capacity to execute virtual machines.

The admin inputs into the VM-migration engine console the desired increase in aggregate capacity.

Once the desired increase is received, the query engine computes a delta between current capacity and desired capacity, and this percentage is transformed by the rules engine to an equivalent measure in terms of VMs to be migrated.

Of course, it is important in such a distributed processing environment to properly manage the resources on which such VM's and distributed applications operate. The system and method described herein thus provide an ontological workflow that assures the health and distribution of such dynamic application provisioning.

Figure 6A:
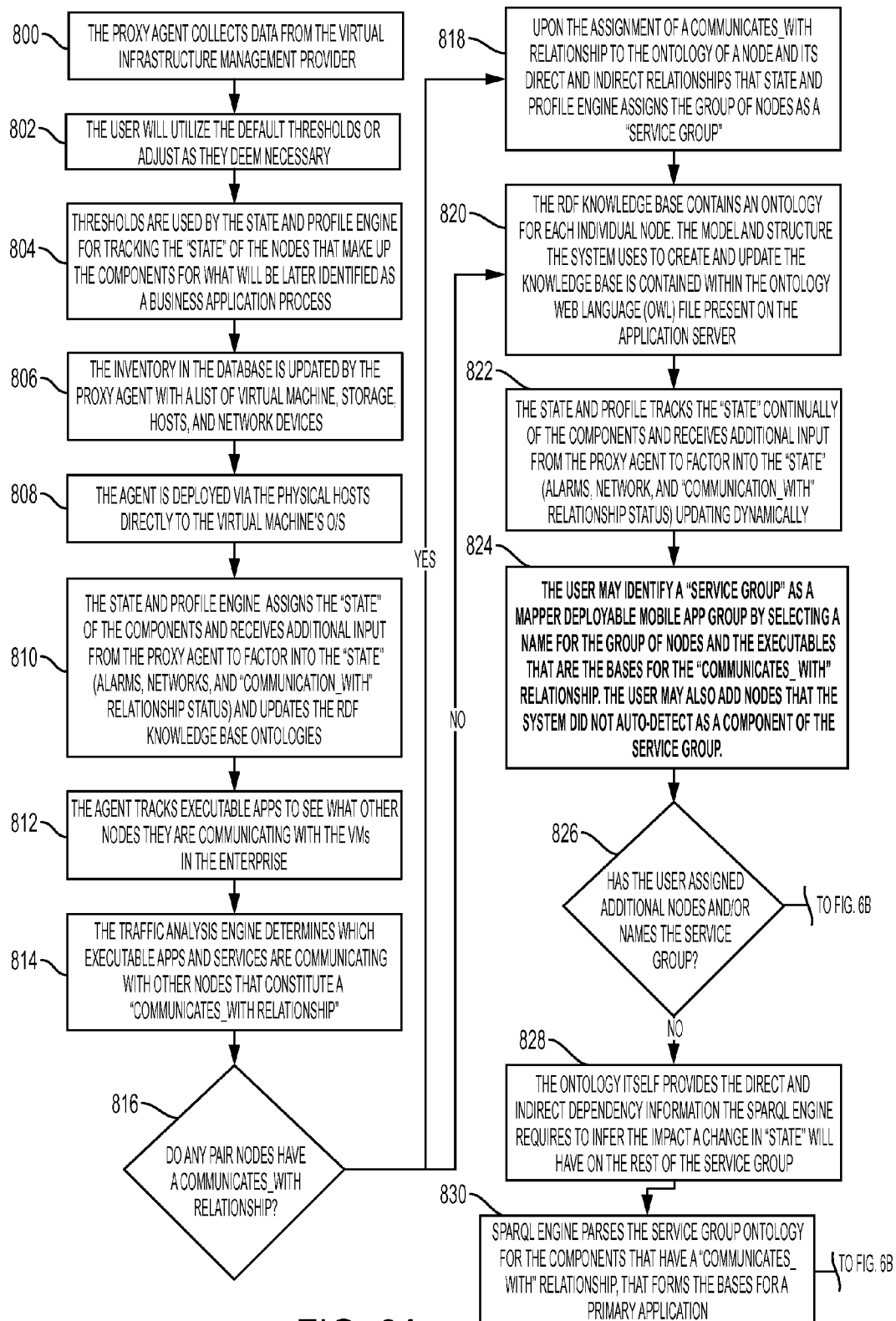
FIGS. 6A through 6C provide a flow chart showing an ontological workflow in accordance with certain aspects of an embodiment of the invention.
Figure 6B:
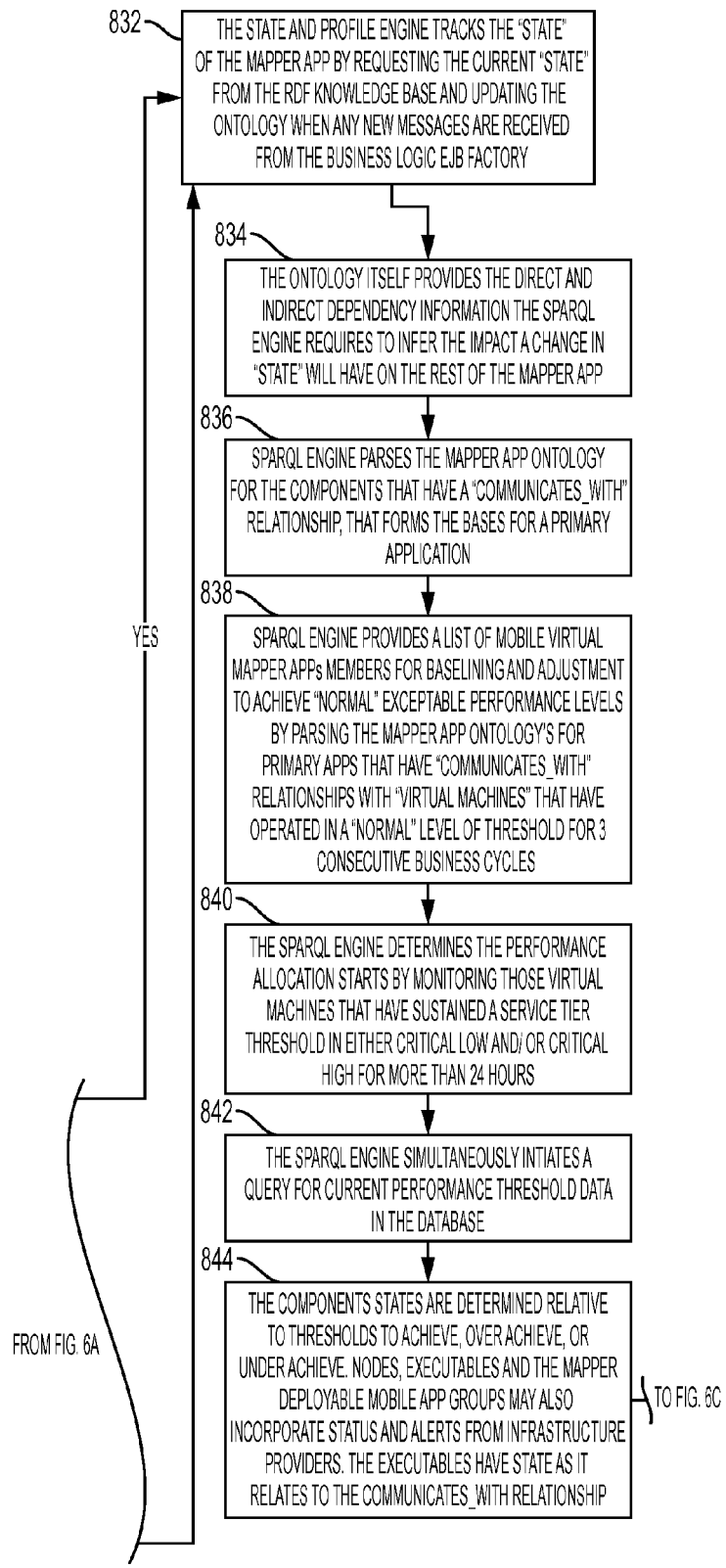
Figure 6C:
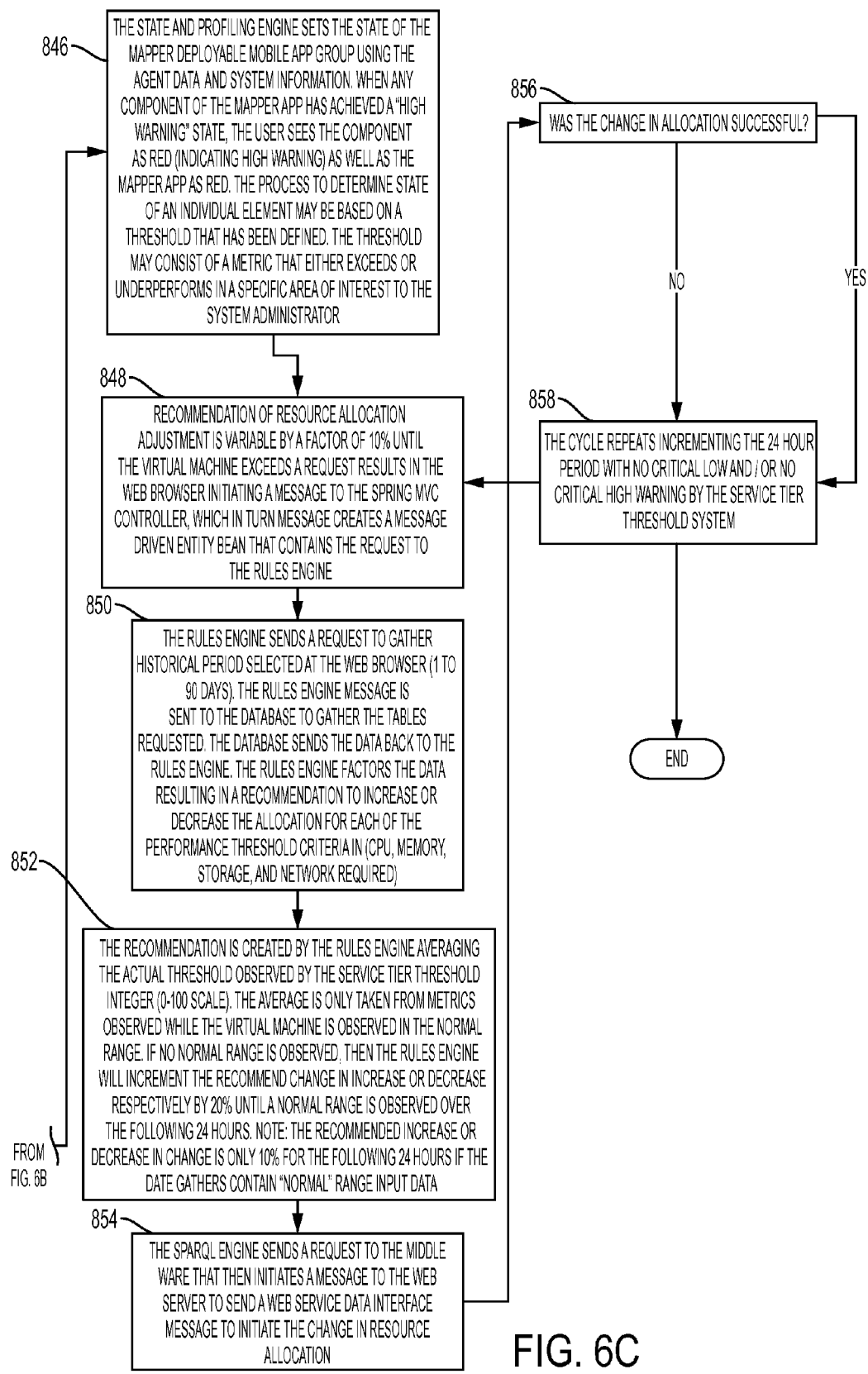

FIGS. 6A through 6C provide a detailed flow chart reflecting an ontological workflow in accordance with certain aspects of an embodiment of the invention. At step 800, a proxy agent collects data from the virtual infrastructure management provider. At step 802, the user will utilize the default thresholds or adjust those thresholds as they deem necessary. As step 804, those thresholds are used by the state and profile engine for tracking the "state" of the nodes that make up the components for what will be later identified as a business application process. At step 806, the inventory in the database is updated by the proxy agent with a list of virtual machine, storage, hosts, and network devices. At step 808, the agent is deployed via the physical hosts directly to the virtual machine's operating system. At step 810, the state and profile engine assigns the "state" of the components and receives additional input from the proxy agent to facto into the "state" (e.g., alarms, network, and "Communication_with" relationship status) and updates the RDF knowledge-base ontologies. At step 812, the agent tracks executable applications to see what other nodes they are communicating with among the VM's in the enterprise. At step 814, a traffic analysis engine determines which executable applications and services are communicating with other nodes that constitute a "Communicates_with" relationship, and a step 816, the system determines whether any pair of nodes have a "Communicates_with" relationship.

At step 818, upon the assignment of a Communicates_with" relationship to the ontology of a node and its direct and indirect relationships, the state and profile engine assigns the group of nodes as a "Service Group."

At step 820, the RDF knowledge base now contains an ontology for each individual node. The model and structure the system uses to create and update the knowledge base is contained within the ontology web language (OWL) file present on the application server.

At step 822, the state and profile engine continually tracks the state of the components and receives additional input from the proxy agent to factor into the state (alarms, network, and "Communication_with" relationship status), updating dynamically.

At step 824, the user may identify a "service group" as a mapper deployable mobile application group by selecting a name for the group of nodes and the executables that are the bases for the "Communicates_with" relationship. The user may also add nodes that the system did not auto-detect as a component of the service group.

At step 826, the system determines whether the user has assigned additional nodes and/or names to the service group. If yes, the process proceeds directly to step 832 described below. If not, at step 828, the ontology itself provides the direct and indirect dependency information that the SPARQL Engine requires to infer the impact a change in state will have on the rest of the service group. At step 830, the SPARQL engine parses the service group ontology for the components that have a "Communicates_with" relationship, that forms the bases for a primary application.

At step 832, the state and profile engine tracks the state of the mapper APP by requesting the current state from the RDF knowledge base and updating the ontology when any new messages are received from a business logic EJB factory.

At step 834, the ontology itself provides the direct and indirect dependency information the SPARQL Engine requires to infer the impact a change in state will have on the rest of the mapper APP.

At step 836, the SPARQL engine parses the mapper APP ontology for the components that have a "Communicates_with" relationship, that forms the bases for a primary application.

At step 838, the SPARQL engine provides a list of mobile virtual mapper APPs members for baselining and adjustment to achieve "normal" exceptable performance levels by parsing the mapper APP ontologies for primary apps that have "Communicates_with" relationships with VM's that have operated in a "normal" level of threshold for 3 consecutive business cycles.

At step 840, the SPARQL engine determines the performance allocation starts by monitoring those virtual machines that have sustained a service tier threshold in either critical low and/or critical high for more than 24 hours.

At step 842, the SQARQL engine simultaneously initiates a query for current performance threshold data in the database.

At step 844, the components states are determined relative to thresholds to achieve, over achieve, or under achieve. Nodes, executables and the mapper deployable mobile app groups may also incorporate status and alerts from infrastructure providers. The executables have state as it relates to the "Communicates_with" relationship.

At step 846, the state and profiling engine sets the state of the mapper deployable mobile app group using the agent data and system information. When any component of the mapper APP has achieved a "high warning" state, the user sees the component as red (indicating high warning) as well as the mapper APP as red. The process to determine state of an individual element may be based on a threshold that has been defined. The threshold may consist of a metric that either exceeds or underperforms in a specific area of interest to the system administrator.

At step 848, recommendation of resource allocation adjustment is variable by a factor of preferably 10% until the virtual machine exceeds a request that results in the web browser initiating a message to the spring MVC controller, which in turn creates a message driven entity bean that contains the request to the rules engine.

At step 850, the rules engine sends a request to gather data from a historical period selected at the web browser (1 to 90 days). The rules engine message is sent to the database to gather the tables requested. The database sends the data back to the rules engine. The rules engine factors the data resulting in a recommendation to increase or decrease the allocation for each of the performance threshold criteria (CPU, memory, storage, and network required).

At step 852, the recommendation is created by the rules engine averaging the actual threshold observed by the service tier threshold integer (0-100 scale) The average is only taken from metrics observed while the virtual machine is observed in the normal range. If no normal range is observed, than the rules engine will increment the recommend change in increase or decrease respectively by preferably 20% until a normal range is observed over the following 24 hours. The recommended increase or decrease in change is preferably only 10% for the following 24 hours if the date gathers contain "normal" range input data.

Finally, at step 854, the SPARQL Engine sends a request to the middle ware that then initiates a message to the web server to send a web service data interface message to initiate the change in resource allocation. The system then, at step 856, evaluates whether the change in allocation was successful, and then at step 858 repeats the cycle, incrementing the 24 hour period with no critical low and/or no critical high warning by the service tier threshold system.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It should be understood, therefore, that the invention may be practiced otherwise than as specifically set forth herein.

What is claimed is:

1. A system for the dynamic provisioning of computer resources to a plurality of mobile devices, each mobile device associated with a human member of a predefined community of interest, comprising:
a provisioning server computer having at least one processor;
an electronic ontology in data communication with said processor;
a knowledge base having a populated ontology in data communication with said processor;
a transactions statistics data store in data communication with said processor; and
memory storing instructions that, when executed by the at least one processor, cause the provisioning server computer to:
receive at said provisioning server computer as input situational data representative of conditions in which said human members of said predefined community of interest are operating;
cause a software implemented rules engine on said provisioning server computer to use a software implemented query engine on said provisioning server to query data in said knowledge base and said transaction statistics data store, and in response to receiving a response from said query engine, cause said software implemented rules engine to communicate a data collection comprising one or more operating systems, one or more software applications, and data to a software implemented inference engine on said provisioning server;
cause said inference engine to select at said provisioning server an operating system, one or more software applications, and data for downloading to each said mobile device, wherein said selected operating system, one or more software applications, and data are selected from said collection received from said rules engine, and wherein said selection of said operating system, one or more software applications, and data is based on said situational data;
assemble at said provisioning server computer said selection of said operating system, one or more software applications, and data in a virtual machine for each one of said mobile devices, wherein each resulting assembly is configured for execution on one of said mobile devices; and
download each said assembled virtual machine to each said mobile device.

2. The system of claim 1, wherein said electronic ontology is configured to define a resource description framework.

3. The system of claim 1, wherein said knowledge base further comprises a populated ontology of classes, attributes, and individual data points that create a structure of relationships collected from internal and external data inputs.

4. The system of claim 1, wherein said transaction statistics data store further comprises data reflecting statistics concerning class individuals and ontological relationships in said knowledge base.

5. The system of claim 1, wherein said rules engine is further configured to analyze thresholds and frequency data in said knowledge base and said transaction statistics data store from a query by said query engine.

6. The system of claim 1 wherein said collection of one or more operating systems, one or more software applications, and data communicated from said rules engine to said inference engine is generated in response to the occurrence of a triggered event.

7. A method for the dynamic provisioning of computer resources to a plurality of mobile devices, each mobile device associated with a human member of a predefined community of interest, comprising:
providing a provisioning server computer having at least one processor;
providing an electronic ontology in data communication with said processor;
providing a knowledge base having a populated ontology in data communication with said processor;
providing a transactions statistics data store in data communication with said processor;
receiving at said provisioning server computer as input situational data representative of conditions in which said human members of said predefined community of interest are operating;
causing a software implemented rules engine on said provisioning server computer to use a software implemented query engine on said provisioning server to query data in said knowledge base and said transaction statistics data store, and in response to receiving a response from said query engine, causing said software implemented rules engine to communicate a data collection comprising one or more operating systems, one or more software applications, and data to a software implemented inference engine on said provisioning server;
causing said inference engine to select an operating system, one or more software applications, and data for downloading to each said mobile device, wherein said selected operating system, one or more software applications, and data are selected from said collection received from said rules engine, and wherein said selection of said operating system, one or more software applications, and data is based on said situational data;
assembling at said provisioning server computer said selection of said operating system, one or more software applications, and data in a virtual machine for each one of said mobile devices, wherein each resulting assembly is configured for execution on one of said mobile devices; and
downloading each said assembled virtual machine to each said mobile device.

8. The method of claim 7, wherein said electronic ontology is configured to define a resource description framework.

9. The method of claim 7, wherein said knowledge base further comprises a populated ontology of classes, attributes, and individual data points that create a structure of relationships collected from internal and external data inputs.

10. The method of claim 7, wherein said transaction statistics data store further comprises data reflecting statistics concerning class individuals and ontological relationships in said knowledge base.

11. The method of claim 7, further comprising the step of causing said rules engine to analyze thresholds and frequency data in said knowledge base and said transaction statistics data store from a query by said query engine.

12. The method of claim 7, wherein said collection of one or more operating systems, one or more software applications, and data communicated from said rules engine to said inference engine is generated in response to the occurrence of a triggered event.

\* \* \* \* \*